United States Patent Office 3,135,449
Patented June 2, 1964

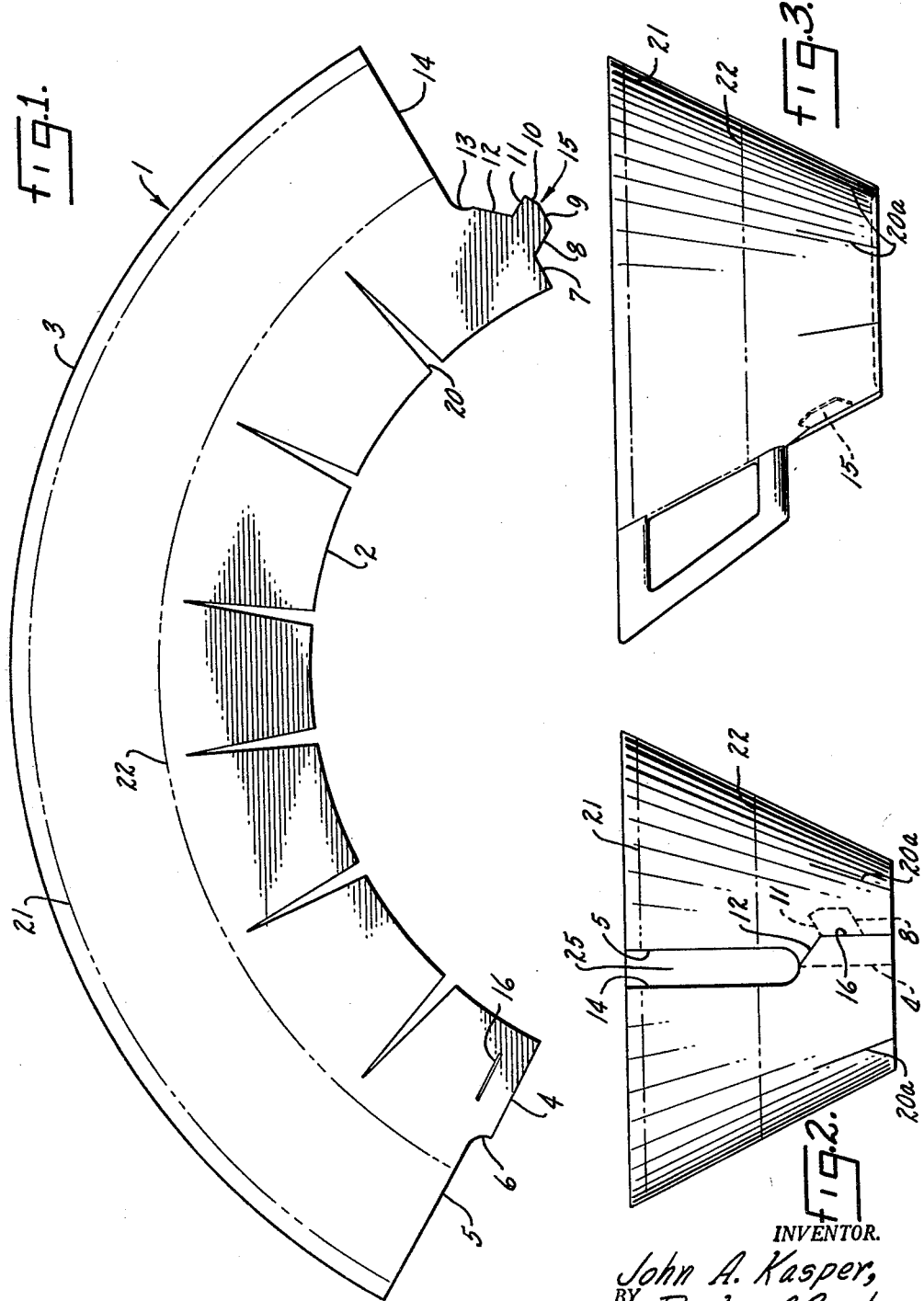

3,135,449
MOLDING FOIL
John A. Kasper, Lincoln, Ill., assignor to Stetson China Company, Lincoln, Ill., a corporation of Illinois
Filed June 29, 1961, Ser. No. 120,672
5 Claims. (Cl. 229—1.5)

This invention relates to the art of manufacturing dinnerware and has particular relation to the art of manufacturing plastic dinnerware.

One purpose of the invention is to provide a means for facilitating the decorative step in the manufacture of plastic dinnerware.

Another purpose is to provide a molding foil for use in the manufacture of plastic dinnerware.

Another purpose is to provide a molding foil for use in the manufacture of plastic dinnerware which shall cause the resulting product to be substantially free of irregularities and imperfections.

Another purpose is to provide a molding foil which shall become an integral part of the finished plastic dinnerware product.

Another purpose is to provide a decorative foil which may be employed in the molding process of plastic dinnerware to produce an integral, decorated molded product.

Another purpose is to reduce the incidence of imperfect molded dinnerware products by providing a molding foil having a particular configuration.

Another purpose is to provide a molding foil having a particularly advantageous locking construction.

Another purpose is to provide a molding foil for generally frusto-conical plastic dinnerware products and having a particular configuration effective to reduce the incidence of irregularities and imperfections.

Other purposes will appear from time to time during the course of the specification and claims.

I illustrate my invention more or less diagrammatically in the accompanying drawings, wherein:

FIGURE 1 is a plan view;

FIGURE 2 is a side elevation illustrating the invention in its operative configuration; and FIGURE 3 is a view, on a reduced scale, illustrating the invention at one stage in the course of manufacture of a plastic dinnerware product.

Like parts are indicated by like numerals throughout the specification and drawings.

Referring now to the drawings, and particularly to FIGURE 1 thereof, I illustrate a molding foil which prior to its employment in the molding cycle, comprises a single thin sheet of rayon paper having an arcuate planar configuration. The inner arcuate edge 2 of the sheet indicated generally at 1 is of less extension than the outer arcuate edge 3 thereof. An end edge 4 lies on a radius of the arcs 2, 3 and joins one end of the inner arcuate edge 2.

At a point spaced toward the outer arcuate edge 3 from the inner arcuate edge 2, the end 4 is recessed, as indicated at 5, the end edge portion 5 lying also on a radius of the arcs 2, 3. The edge 4 and recessed portion 5 are joined by a curved edge segment 6 and the edge portion 5 extends to the arcuate outer edge 3.

At its opposite end edge, the member 1 has an end edge portion 7 joining the end of arcuate edge 2 opposite that joined by the edge 4 and lying substantially along a radius of the arcs 2, 3. Inwardly spaced from the arcuate edge 2 and extending angularly from the edge portion 7 and away from the end edge 2 is the edge portion 8. An edge portion 9 joins the portion 8 and extends substantially along a radius of the arcs 2, 3, and substantially parallel with the portion 7. The portion 9 is joined by an edge portion 10 inclined away from portion 9 and rearwardly or inwardly toward the sheet 1. An edge portion 11 joins edge 10 and lies in a plane substantially paralleling that of edge 8. The edge 11 terminates at a point in alignment with the edge 7. Extending from said point is an edge portion 12 which is inclined rearwardly or inwardly toward the body of sheet 1 and away from the arcuate inner edge 2 thereof. A curved edge portion 13 joins the portion 12 to edge portion 14 which lies substantially in the plane of a radius of arcs 2, 3 and extends from the curved section 13 radially outwardly to intersect the end of outer arcuate edge 3 opposite that joined by end edge 5.

It will be observed that the curved edge portions 6, 13 are substantially identical and that the edge portions 8–11 together define an ear or locking tab which may be further identified by the numeral 15. A thin, radially directed slot 16 is formed in the sheet 1 adjacent and arcuately inwardly spaced from the end edge portion 4 which it parallels, the slot 16 being spaced inwardly from the arcuate edge 2 and intermediate the arcuate edge 2 and the curved end edge portion 6.

Circumferentially spaced along and intersecting the arcuate edge 2 is a plurality of conical or V-shaped slots 20. The slots 20 have the base of the V spaced inwardly from the arcuate edge 2 and the legs of the V intersecting the arcuate edge 2. It will be observed that the slots 20 extend inwardly from the arcuate edge 2 for a distance less than the width of the sheet 1.

Indicated by the dotted lines 21, 22 is an arcuate band portion of the sheet 1 which is positioned intermediate the inner ends of the slots 20 and the arcuate outer edge 3 for convenient reception of a decorative design. While such design may be allowed to extend outside the band or area 21—22, the preferred embodiment locates the design therein.

The use and operation of my invention are as follows:

In the manufacturing process of plastic dinnerware, a supply of raw material, for example, melamine powder, is placed in a mold. The mold is closed and heated.

The sheet 1 of the invention is impregnated with melamine, the sheet 1 having formed in the band or area 21, 22 thereof the design to be produced on the item of plastic dinnerware.

Considering the manufacture of a plastic cup, for example, the sheet 1 is bent upon itself to form a cone. The ear 15 is inserted through slot 16, the sheet 1 being distorted slightly to permit the entry of ear 15 into slot 16. As best seen in FIGURE 2, the inclined edges 8, 11 of ear 15 cause a locking engagement thereof when the ear 15 has penetrated slot 16, the end edge portion 11 rising upwardly above the upper edge of slot 16, as the parts are shown in the drawings. When the ear 15 has completely penetrated slot 16, the portion of sheet 1 between slot 16 and edge 4 is positioned within or behind the portion of sheet 1 from which ear 15 extends. The edge portion 4 is in radial alignment with the point of juncture of curved edge portion 13 and inclined edge portion 12, thus bringing the curved edge segments 6, 13 into abutting relationship and bringing the end edge portions 5, 14 into spaced opposed, parallel relationship to form a generally U-shaped slot in the side wall of the cone now formed of the sheet 1.

When the sheet 1 was bent upon itself to form the cone illustrated, for example, in FIGURE 2, the legs of each of the V-shaped slots 20 intersecting the inner arcuate edge 2 of the sheet 1 were brought into abutting relationship, as best indicated at 20a in FIGURE 2.

The mold is opened before complete curing of the material therein and the outer surface of the cup is exposed. The cone foil is then placed on the partially completed, or partially cured plastic cup, the ear or handle segment of the cup 1 being poositioned in and extending through the slot formed of its portions 5, 6, 13, 14, the said slot being indicated at 25 in FIGURE 2. The mold is again closed upon the partially cured cup and the melamine impregnated rayon paper cone together. The abutting legs of the slots 20 are effective to prevent bunching or irregularity in the outer surface of the cone 1. The positive locking engagement of ear 15 in slot 16 are effective to insure against a separation or bunching at the juncture of the opposite ends of the sheet 1 when the cup and foil are again enclosed within the mold.

The mold is then again heated, the melamine-impregnated rayon paper foil 1 becoming embedded in and an integral part of the cup as the secondary cure occurs in the mold. The design or pattern appearing on the band 21, 22 of foil 1 thus becomes an integral part of the finished plastic dinnerware cup product, the necessity for gluing foil ends together and the employment of bulky locking arrangements having been obviated.

Whereas I have described and claimed a preferred embodiment of the invention, it will be understood that further modifications will suggest themselves to those skilled in the art upon a reading of the foregoing specification as, for example, the foil 1 could be employed with a variety of generally conically shaped plastic dinnerware, the use thereof in connection with a cup being for illustrative purposes. Accordingly, the foregoing description should be taken as merely illustrative and not definitive, and the scope of the invention should be limited only by the following appended claims.

I claim:

1. A molding foil for plastic cups and the like comprising a single sheet of melamine-impregnated rayon paper, said sheet having a planar arcuate configuration with outer and inner arcuate edges, a design zone impregnated with melamine on said paper, the inner arcuate edge of said sheet having a plurality of circumferentially spaced slots formed therein to permit the paper to be formed around a tapered annular portion of dinnerware, the outer arcuate edge adapted to be formed around another annular portion of the dinnerware, a radially disposed slot adjacent and inwardly spaced from one end of the inner arcuate edge of said sheet, an ear portion extending from the opposite edge of said sheet, said ear portion being formed and adapted for penetration with said last-named slot, said ear portion having an edge inclined toward the arcuate outer edge of said sheet and away from the outer edge of said slot when said ear and slot are in interpenetrating relationship.

2. A molding foil for plastic dinnerware and the like comprising a single sheet of rayon paper having an arcuate planar configuration with inner and outer arcuate edges, a design zone on said sheet for transferring a design to the dinnerware, a pair of radially disposed opposite end edges on said sheet, said end edges having extensions adjacent and joining the arcuate inner edge of said sheet, said end edges having curved segments joining said end edges with said extensions, a locking mechanism positioned for locking engagement of said extensions, said curved portions together forming the base of a U-shaped slot when said extensions are in locking engagement, said end edge portions lying in opposed parallel spaced relationship and forming the legs of said U-shaped slot when said extensions are in locking engagement, whereby the projection on the dinnerware may be positioned in the slot.

3. A molding foil for plastic dinnerware and the like comprising a single sheet of rayon paper having an arcuate planar configuration, a pair of radially disposed opposite end edges on said sheet, said end edges having extensions adjacent and joining the arcuate inner edge of said sheet, said end edges having curved segments joining said end edges with said extensions, a locking mechanism positioned for locking engagement of said extensions, said curved portions together forming the base of a U-shaped slot when said extensions are in locking engagement, said end edge portions lying in opposed parallel spaced relationship and forming the legs of said U-shaped slot when said extensions are in locking engagement, and means for effecting said locking engagement, said last-named means comprising a radially disposed slot in one of said extensions, an angularly disposed ear in the other of said extensions, said ear having a width substantially equal to the linear extension of said last-named slot, said ear being inclined away from said inner edge portion and toward said outer edge portion, said last-named slot being of a linear extension substantially equal to the base of said ear whereby said ear cannot be disengaged from interpenetrating relationship with said slot while said curved edge segments are in abutting aligned relationship.

4. A molding foil for plastic dinnerware and the like comprising a single sheet of rayon paper having an arcuate planar configuration, a pair of radially disposed opposite end edges on said sheet, said end edges having extensions adjacent and joining the arcuate inner edge of said sheet, said end edges having curved segments joining said end edges with said extensions, a locking mechanism positioned for locking engagement of said extensions, said curved portions together forming the base of a U-shaped slot when said extensions are in locking engagement, said end edge portions lying in opposed parallel spaced relationship and forming the legs of said U-shaped slot when said extensions are in locking engagement, and means for effecting said locking engagement, said last-named means comprising a radially disposed slot in one of said extensions, an angularly disposed ear in the other of said extensions, said ear having a width substantially equal to the linear extension of said slot, said ear being inclined away from said inner edge portion and toward said outer edge portion, said slot being of a linear extension substantially equal to the base of said ear whereby said ear cannot be disengaged from interpenetrating relationship with said slot while said curved edge segments are in abutting aligned relationship, and a plurality of circumferentially spaced, V-shaped slots intersecting the inner arcuate edge of said sheet and extending from said inner arcuate edge for a distance less than half the width of said sheet.

5. A molding foil for plastic dinnerware and the like comprising a single sheet of rayon paper having an arcuate planar configuration, a pair of radially disposed opposite end edges on said sheet, said end edges having extensions adjacent and joining the arcuate inner edge of said sheet, said end edges having curved segments joining said end edges with said extensions, a locking mechanism positioned for locking engagement of said extensions, said curved portions together forming the base of a U-shaped slot when said extensions are in locking engagement, said end edge portions lying in opposed parallel spaced relationship and forming the legs of said U-shaped slot when said extensions are in locking engagement, and means for effecting said locking engagement, said last-named means comprising a radially disposed slot in one of said extensions, an angularly disposed ear in the other of said extensions, said ear having a width substantially equal to the linear extension of said slot, said ear being inclined away from said inner edge portion and toward said outer edge portion, said slot being of a linear extension substantially equal to the base of said ear whereby said ear cannot be disengaged from interpenetrating relationship with said slot while said curved edge segments are in abutting aligned relationship, and a plurality of circumferentially spaced, V-shaped slots intersecting the inner arcuate edge of said sheet and extending from said inner arcuate edge for a distance less than half the width of said sheet, the legs of each of said V-shaped slots being spaced apart a distance sufficient to cause said legs to abut when said sheet is bent upon itself to form a cone.

References Cited in the file of this patent

UNITED STATES PATENTS

| | | |
|---|---|---|
| 453,495 | Mersman | June 2, 1891 |
| 483,641 | Bailey | Oct. 4, 1892 |
| 2,022,601 | McDonald | Nov. 26, 1935 |
| 2,106,738 | Harrison | Feb. 1, 1938 |
| 2,708,645 | Norman | May 17, 1955 |
| 2,824,032 | Rackleff | Feb. 18, 1958 |
| 2,944,298 | Bernhardt et al. | July 12, 1960 |
| 2,949,216 | Brewer | Aug. 16, 1960 |
| 2,966,292 | Saidel | Dec. 27, 1960 |